United States Patent [19]

Schwaiger et al.

[11] 4,336,190
[45] Jun. 22, 1982

[54] COPPER COMPLEX FORMAZAN COMPOUNDS, PROCESS FOR THEIR MANUFACTURE AND THEIR USE AS DYESTUFFS

[75] Inventors: Günther Schwaiger; Ernst Hoyer, both of Frankfurt am Main, Fed. Rep. of Germany

[73] Assignee: Hoechst Aktiengesellschaft, Frankfurt am Main, Fed. Rep. of Germany

[21] Appl. No.: 204,915

[22] Filed: Nov. 7, 1980

[30] Foreign Application Priority Data

Nov. 10, 1979 [DE] Fed. Rep. of Germany ....... 2945537

[51] Int. Cl.³ ............................................. C09B 50/00
[52] U.S. Cl. ...................................... 260/149; 8/549; 8/681; 8/686; 8/918; 260/146 R
[58] Field of Search .......................... 8/549, 681, 686; 260/146 R, 149

[56] References Cited

U.S. PATENT DOCUMENTS 2,662,075 12/1953 Brooks ................................ 260/149
3,068,219 12/1962 Beffa et al. ......................... 260/149

FOREIGN PATENT DOCUMENTS 1194504 6/1970 United Kingdom .
1540565 2/1979 United Kingdom .

*Primary Examiner*—A. Lionel Clingman
*Attorney, Agent, or Firm*—Curtis, Morris & Safford

[57] ABSTRACT

This invention relates to novel copper complex formazan compounds of the formula

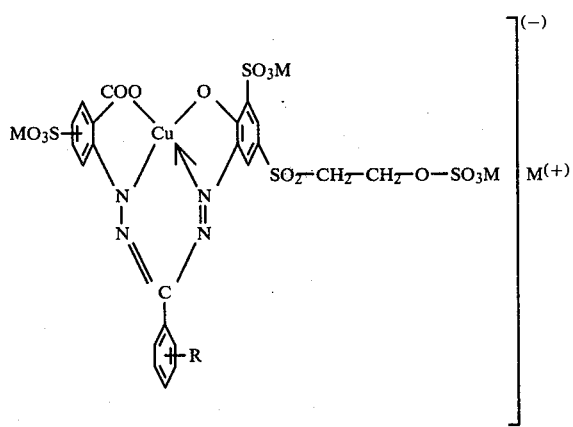

in which M is hydrogen or the equivalent of a metal and R is hydrogen or chlorine. The invention also relates to a process for their manufacture. The compounds can be used as dyestuffs, in particular fiber reactive dyestuffs for dyeing cellulose fiber materials, wool, or synthetic polyamide fiber materials for example, on which they exhibit intense blue dyeings having good fastness properties.

5 Claims, No Drawings

COPPER COMPLEX FORMAZAN COMPOUNDS, PROCESS FOR THEIR MANUFACTURE AND THEIR USE AS DYESTUFFS

Copper and nickel complex formazan compounds are known from German Auslegeschrift No. 1,256,622, Examples 14 and 15 of the table and from German Auslegeschrift No. 1,719,083. These compounds are, however, not fully satisfactory as to their utilitarian properties.

The present invention provides novel copper complex formazan compounds of the formula (1)

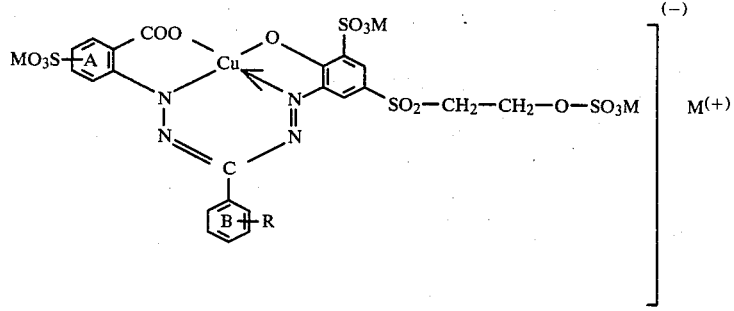 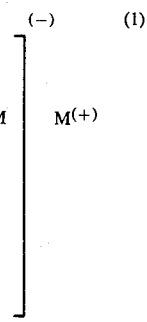

in which

M is a hydrogen atom or the equivalent of a metal, preferably of an alkali metal or alkaline earth metal, more preferably sodium, potassium or of calcium.

R is a hydrogen atom or a chlorine atom bound to the phenyl B group preferably in the 2- or 4-position, and the sulfo group in the phenylene A group is preferably bound to the aromatic nucleus in the m- or p-position with respect to the nitrogen atom.

The novel compounds of the formula (1) can be in their acid form, preferably in the form of their salts, in particular the alkali metal and alkaline earth metal salts specified above. They are used for dyeing (in the most common sense including printing) materials containing hydroxy groups, amino groups and/or carbonamido groups.

The present invention also provides a process for the manufacture of compounds of the formula (1) as defined above which comprises reacting an aromatic hydrazone compound of the formula (2)

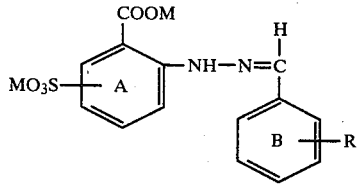

in which A, R, B and M are as defined under formula (1) with the diazonium compound of an aromatic amine of the formula (3)

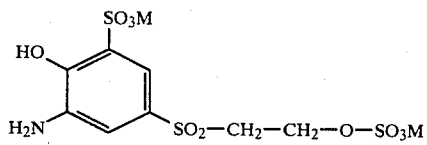

in which M is as defined above, and with a copper-donating agent. The process can be carried as usual and analogous to known processes for the manufacture of metal complex formazan dyestuffs.

The process of the invention is preferably carried out at a pH of 4 to 7, more preferably 5 to 7, and at a temperature of from about 0° C. to 20° C.

The reaction components can be added in any desired order, although the process can be easily carried out as a three-component-reaction.

It proved advantageous to adjust the reaction mixture, afte the coupling and metallization reaction, with a strong mineral acid, for example hydrochloric acid, to a pH-value of below 2, for example of approximately 1, and to keep the reaction mixture at this pH for some time, for example for 30 minutes to 2 hours, at room temperature (15° to 30° C.), optionally while stirring. In this manner some fastness properties, for example the fastness to light, the coloring strength and the purity of color shade of the formazan compound prepared are considerably improved. It is thus not necessary to dry the reaction product at temperatures above 100° C., for example at about 150° C., which would reduce the color yield of the copper complex formazan compounds obtained.

Suitable copper-donating compounds are, for example, simple and complex salts of copper such as copper sulfate, copper chloride, copper acetate, or copper carbonate, and copper salts of salicyclic acid and tartaric acid.

If copper salts of mineral acids are used, it proved advantageous to operate in the presence of an acid-neutralizing agent, for example an alkali metal or alkalline earth metal hydroxide or carbonate, or an alkali metal salt of a low-molecular weight alkane-carboxylic acid, for example of acetic acid, or a basic alkali metal salt of phosphoric acid. Preferred alkali metal and alkaline earth metal salts are, in particular, the sodium and potassium compounds, for example sodium hydroxide, potassium hydroxide, calcium hydroxide, calcium carbonate, sodium and potassium carbonate, sodium bicarbonate, sodium acetate, disodium hydrogenophosphate, and trisodium phosphate.

The copper-donating agent is used in an at least equimolar amount so that one copper atom is available for one mol of compound of the formula (1). Generally, the metallization is complete at room temperature.

The copper complex formazan compounds of the formula (1) can be prepared, for example, by dissolving the hydrazone compound of the formula (2) in water at room temperature with an alkali, for example sodium hydroxide (advantageously in form of an aqueous solution) or sodium carbonate, preferably while maintaining a pH of 6 to 7. The diazonium salt solution of the amine of the formula (3) is then added while paying attention that the reaction mixture is neither alkaline nor is too strongly acid in order not to damage the β-sulfatoethylsulfonyl group in the alkaline range, or, respectively, to avoid precipitation of the hydrazone and, consequently, a heterogeneous reaction in the acid range.

The reaction is preferably carried out at a pH of from 4 to 7, more preferably 5 to 7. The reaction temperature should advisably not exceed 20° C., especially advantageously not exceed 15° C. Simultaneously with the diazonium compound or together with it (i.e. in mixture with it) or after the addition of the diazonium compound, the at least equimolar amount of the copper-donating agent is added, for example an aqueous solution of copper sulfate. The metallization reaction is also carried out advantageously at a pH of from 4 to 7, especially of from 5 to 7. Metallization and coupling reaction may proceed simultaneously. The metallization reaction proceeds relatively rapidly. As mentioned above, it proved advantageous to acidify the reaction solution, for example with concentrated hydrochloric acid or sulfuric acid, to a pH of about 1 prior to the isolation of the metal complex formazan compound and to stir the mixture for approximately 1 hour at room temperature. The mixture is then adjusted to a pH of from 5 to 6, and the metal complex formazan compound is isolated in usual manner, for example by salting out with an electrolyte, for example sodium chloride or potassium chloride. Alternatively, the compound can be isolated by concentrating the solution by evaporation, for example by spray-drying.

Another way to produce the compounds of the invention consists in proceeding in the manner described above while using, instead of the amine of the formula (3), 4-β-hydroxyethylsulfonyl-2-aminophenol-6-sulfonic acid. The copper complex formazan compound thus obtained contains the β-hydroxyethylsulfonyl group rather than the β-sulfatoethylsulfonyl group. This β-hydroxyethylsulfonyl compound can be converted into the sulfato compound according to formula (1) in known manner by means of a sulfation agent, preferably with amidosulfonic acid or chlorosulfonic acid in the presence of pyridine.

The first mode of preparation using the aromatic amine of the formula (3) proved to be more advantageous.

When the compound of the formula (1) is prepared from 4-β-hydroxyethylsulfonyl-2-aminophenol-6-sulfonic acid, the reaction to form the metal complex formazan compound can also take place at a pH of from 4 to 12. The metallization reaction per se should, however, be carried out at a pH of from 4 to 8 if it is performed in the absence of a complex forming agent such as tartaric acid, citric acid or ammonia.

The hydrazone compounds of the formula (2) used as starting compounds are obtained from corresponding 2-carboxysulfophenyl-hydrazine compounds (which on their part can be obtained in a manner known per se, for example from the corresponding diazonium compound with a salt of sulfurous acid with hydrolysis of the intermediary N-sulfonic acid with a mineral acid) by reaction with benzaldehyde or chlorobenzaldehyde, preferably without intermediate isolation of the hydrazones.

The aromatic amine of the formula (3) used as starting compound can be prepared in known manner, for example by reaction of 4-β-hydroxyethylsulfonyl-2-aminophenol with concentrated sulfuric acid preferably containing sulfur trioxide.

The copper complex formazan compounds of the invention possess valuable dyestuff properties. Due to their β-sulfatoethylsulfonyl group they have also fiber reactive properties. They are preferably used for dyeing (in the most common sense including dyeing in the mass and printing) materials containing hydroxy, amino and/or carbonamide groups, for example in the form of flat structures such as sheets, paper and leather, or in the mass, for example polyamide and polyurethane, and more preferably in fiber form.

Hence, the present invention also relates to the use of the compounds of the formula (1) for dyeing the aforesaid materials (inclusive of dyeing in the mass and printing) and to processes for dyeing the aforesaid materials in known manner using as a coloring matter a compound of the formula (1). The compounds of the invention are preferably used for dyeing fiber materials, more preferably textile fibers.

Materials containing hydroxy groups include natural and synthetic materials, for example cellulose fiber materials or the regeneration products thereof, or polyvinyl alcohols. Cellulose fiber materials are preferably cotton, but also fibers from other plants, such as linen, hemp, jute and ramie fibers. Regenerated cellulose fibers are, for example, those of spun rayon and viscose.

Materials containing carbonamide groups are, for example, synthetic and natural polyamide and polyurethanes, in particular in the form of fibers, such as wool and other animal hair, silk, leather, polyamide-6,6, polyamide-6, polyamide-11 and polyamide-4.

The compounds of the invention can be applied and fixed on the aforesaid substrata, in particular on the fiber materials, by techniques known for water-soluble dyestuffs, especially for fiber-reactive dyestuffs.

For example, very good color yields are obtained on cellulose fibers by the exhaust process from a long bath with the use of an acid-binding agent and optionally with the use of a neutral salt, for example sodium chloride or sodium sulfate. The material is dyed in an aqueous bath at a temperature of from 60° to 100° C., optionally up to 120° C. under pressure, if desired with addition of a usual dyeing auxiliary. To this end, the material is introduced into the warm bath, which is then gradually heated to the desired dyeing temperature and the dyeing process is terminated at said temperature. Alternatively, neutral salts accelerating the exhaustion of the dyestuff can be added to the bath when the dyeing temperature proper is reached.

Excellent color yields are also obtained on cellulose fibers by the padding process, in which process fixation may be performed, in usual manner, in the presence of an alkaline agent, by storing for some time at room temperature or elevated temperature, for example up to about 60° C., or by steaming or by means of dry heat.

Also when applying the common processes for printing cellulose fibers, color-intense prints with clear outlines and a clear white ground are also obtained. These printing processes may be carried out in one phase, for example in the presence of sodium bicarbonate or another acid-binding agent in the printing paste, with subsequent steaming at 101° to 103° C., or in two phases, for example by printing with a neutral or weakly acid printing paste and then fixing the dyestuff either by passing the printed material through a hot alkaline bath containing an electrolyte or by padding it over with an alkaline padding liquor containing an electrolyte with subsequent storing the so-treated material for some time, or by steaming or treating same with dry heat. The quality of the prints is only little dependent on the different fixing conditions. The degree of fixation (i.e. fixation rate) obtainable with the compounds of the invention is very high in dyeing as well as in printing.

For fixation by means of dry heat according to the usual thermofixation processes hot air of 120° to 200° C. is used. Besides the commonly used steam of 101° to 103° C., superheated steam and pressurized steam of temperatures up to 160° C. can also be used.

Suitable acid-binding agents causing the fixation of the dyestuffs on the fiber are, for example, water-soluble basic salts of alkali metals and alkaline earth metals with inorganic or organic acids, or compounds which form alkali in the heat. Alkali metal hydroxides and alkali metal salts of weak to medium strong inorganic acids or organic acids are especially suitable; the sodium and potassium compounds thereof are preferred. Acid-binding agents of this type are, for example, sodium hydroxide, potassium hydroxide, sodium carbonate, sodium bicarbonate, potassium carbonate, sodium formate, sodium dihydrogenophosphate, disodium hydrogenophosphate, sodium trichloroacetate, water glass and trisodium phosphate.

By the treatment of the compounds of the invention with the acid-binding agents, optionally under the action of heat, the compounds (dyestuffs) of the invention are chemically bound to the cellulose fiber. In particulr the dyeings on cellulose fibers exhibit outstanding wet-fastnesses after the usual treatment, i.e. rinsing to remove dyestuff portions that have not been fixed.

The compounds of the invention are characterized, in particular, by a good stability in printing pastes and padding liquors, even in the presence of alkali, by a very good exhaustion capacity from long baths, by a good color build-up in the usual dyeing and printing processes, by an equal depth of shade in the dyeing of cotton and regenerated cellulose fibers, a level appearance of the goods dyed or printed therewith and by uniform dyeings from long baths with the addition of varying amounts of electrolyte.

Polyurethane fibers and polyamide fibers are usually dyed from an acid medium. To obtain the desired pH, for example, acetic acid and/or ammonium sulfate and/or acetic acid and ammonium acetate or sodium acetate can be added to the dye bath. To obtain dyeings of satisfactory levelness the addition of conventional levelling auxiliaries, for example on the basis of a reaction product of cyanuric chloride with three times the molar amount of an aminobenzenesulfonic acid and/or an aminoaphthalenesulfonic acid and/or on the basis of a reaction product, for example, of stearyl amine with ethylene oxide is recommended. In general, the material is to be dyed is introduced at about 40° C. into the weakly alkaline bath, it is kept in motion in said bath for some time, whereupon the bath is adjusted to a weakly acid, preferably weakly acetic acid pH. The dyeing proper is then carried out at a temperature of from 60° to 98° C. Alternatively, the material can be dyed at boiling temperature or at a temperature of up to 120° C. (under pressure).

The dyeings and prints produced with the compounds of the invention are characterized by very clear and mainly blue shades. In particular, the dyeings and prints on cellulose fiber material have a high color strength, a very good fastness to light and rubbing and outstanding wet-fastnesses, for example fastnesses to washing, to sodium hypochlorite, to chlorinated water in swimming pools, to fulling or milling, to alkali and to perspiration. Portions of dyestuff that have not been fixed can be easily and completely washed out of the fiber material, which is an essential prerequisite for the good wet-fastness of the dyeings obtained. In addition, the dyeings are stable to a conventional finish with artificial resins. Some of the compounds of the invention (dyestuffs) reach the usual anthraquinone standard as regards the purity (clearness) of shade and, in addition, they have the advantage that they are much easier to discharge than the said anthraquinone dyestuffs.

The following examples illustrate the invention, the parts are parts by weight and the percentages are percent by weight and the relation of parts by weight to parts by volume is as kilogram to liter.

EXAMPLE 1

32.0 parts of the hydrazone from 2-carboxyphenylhydrazine-4-sulfonic acid with benzaldehyde are suspended in 200 parts of water of 20° to 25° C. and dissolved at a pH of 6.5 to 7 by adding an aqueous sodium hydroxide solution. At a temperature of 5° to 15° C. the aqueous diazonium salt solution of 4-$\beta$-sulfatoethylsulfonyl-2-aminophenol-6-sulfonic acid, obtained by usual diazotization of 37.7 parts of the respective aminophenol in aqueous solution, are added to the solution, and upon that 100 parts by volume of an aqueous 1-molar copper sulfate solution are slowly added at a temperature of from 10° to 15° C. over a period of 15 minutes, while maintaining the pH in the range of from 5.5 to 6.5 with a total amount of 18 parts of sodium carbonate. Stirring of the mixture is continued for 1 hour at room temperature until coupling is complete, whereupon a pH of about 1 is adjusted wtih 30 parts by volume of concentrated hydrochloric acid. The strongly acid solution is stirred for another hour, sodium or potassium carbonate is then added to a pH of 5.5 and the formed copper complex formazan compound is precipitated by means of sodium or potassium chloride. It is filtered off, washed with dilute aqueous sodium or potassium chloride solution and dried at 80° C. A dark powder is obtained which dissolves in water to give a dark blue solution. It contains beside the electrolyte the respective alkali metal salt (sodium or potassium) of the compound of the formula

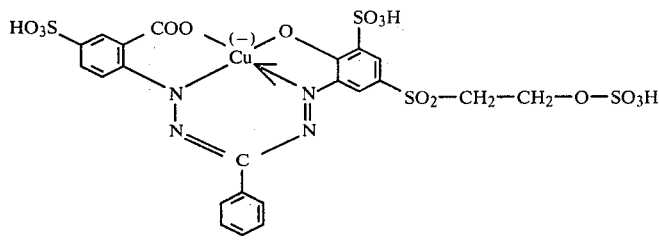

The compound is well suitable for dyeing cotton and regenerated cellulose fibers clear blue shades from a long bath containing an acid-binding agent. The dyeings treated in usual manner by soaping and rinsing with water for 10 minutes have very good fastnesses to light and wet processing.

EXAMPLE 2

32.0 parts of the hydrazone from 2-carboxyphenylhydrazine-5-sulfonic acid and benzaldehyde are suspended at 20° to 25° C. in 300 parts of water and dissolved with aqueous sodium hydroxide solution at pH 6.5 to 7. An aqueous solution of the diazonium salt of 37.7 parts of 4-β-sulfatoethylsulfonyl-2-aminophenol-6-sulfonic acid, obtained by conventional diazotization, and simultaneously 100 parts by volume of an aqueous 1-molar solution of copper sulfate (the diazonium salt solution and the copper sulfate solution may as well be combined before addition) are added over a period of 10 to 20 minutes, while maintaining the temperature between about 5° to 20° C., preferably 10° and 15° C., and the pH at 5.5 to 6.5 by addition of approximately 19 parts of sodium carbonate. Stirring of the reaction mixture is continued for about 1 hour at 15° to 25° C., whereupon a pH of 1 is adjusted with about 30 parts by volume of concentrated hydrochloric acid. The acid solution is maintained for 1 hour at about 20° C., whereupon a pH of 5.5 is adjusted with potassium carbonate. The copper complex formazan compound formed is precipitated with potassium chloride, filtered off, washed with dilute aqueous potassium chloride solution and thoroughly dried at 80° C. A dark powder is obtained containing, beside the electrolyte (potassium chloride), the alkali metal salt (mainly the potassium salt) of the compound of the formula This copper complex formazan compound is well suitable as water-soluble dyestuff for dyeing cellulose fiber materials and polyamide fiber materials. According to usual methods of application and fixation, intense and clear blue dyeings and prints of high color strength and outstanding fastnesses to light and wet treatment are obtained.

EXAMPLE 3

35.5 parts of the hydrazone from 2-carboxyphenylhydrazine-4-sulfonic acid and 2-chlorobenzaldehyde are suspensed in 250 parts of water of 15° to 25° C. and dissolved at pH 6.5 to 7 with aqueous sodium hydroxide solution. 150 parts by volume of an aqueous solution containing 25 parts of copper sulfate (calculated on crystalline copper sulfate) are added while maintaining a pH of 6 to 7. Next, an aqueous solution of the diazonium salt obtained by conventional diazotization of 37.7 parts of 4-β-sulfatoethylsulfonyl-2-aminophenol-6-sulfonic acid are added; during the addition of the diazonium salt solution the pH is maintained at a value of 5.5 to 6.5 with sodium carbonate. The reaction mixture is stirred for 1 hour to complete the coupling reaction and metallization reaction, whereupon a pH of 1 is adjusted by addition of approximately 30 parts by volume of concentrated hydrochloric acid. The strongly acid solution obtained is stirred for another hour, whereupon the pH is adjusted to 5.5 with sodium or potassium carbonate. The copper complex formazan compound formed is precipitated with sodium or potassium chloride, filtered off, washed with dilute sodium or potassium chloride solution and thoroughly dried at 80° C. The copper complex compound obtained in the form of its sodium or potassium salt has, in the form of the free acid, the following formula

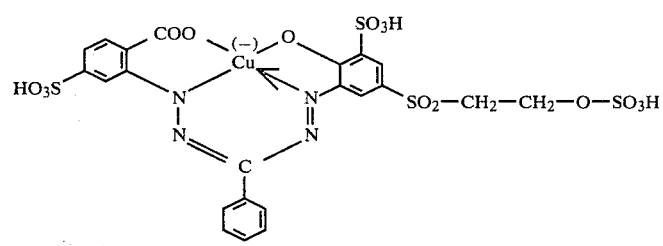

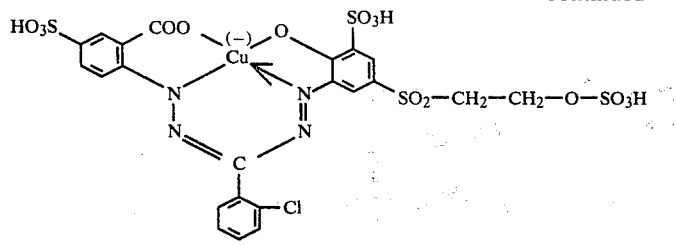

It has very good dyestuff properties and dyes cellulose fiber materials, by the usual application and fixation processes for fiber reactive dyestuffs, reddish blue shades of good fastnesses, in particular a good fastness to light.

We claim:

1. A copper complex formazan compound of the formula

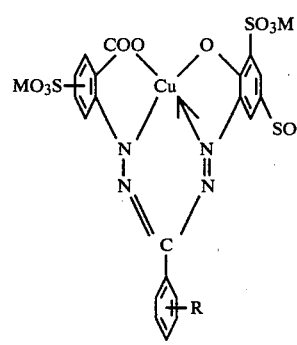

in which M is hydrogen or the equivalent of a metal and R is hydrogen or chlorine.

2. A compound according to claim 1 of the formula

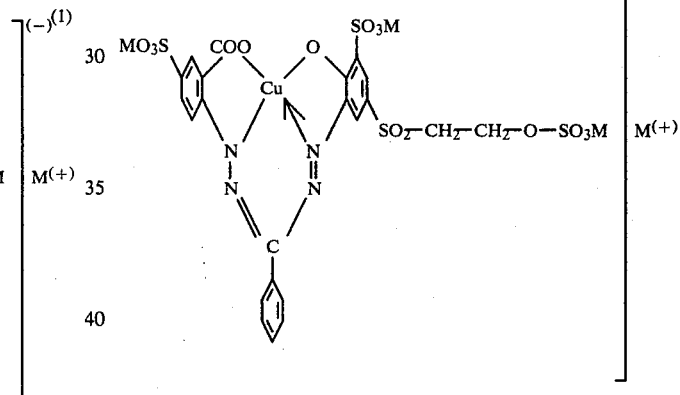

in which M is as defined in claim 1.

3. A compound according to claim 1 of the formula

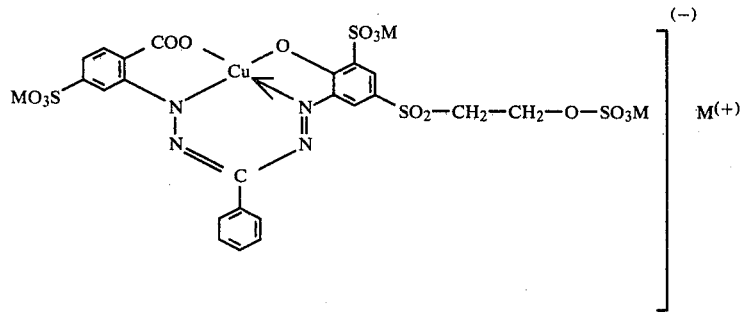

in which M is as defined in claim 1.

4. A process for the manufacture of a compound according to formula (1) of claim 1, in which an aromatic hydrazone compound of the formula (2)

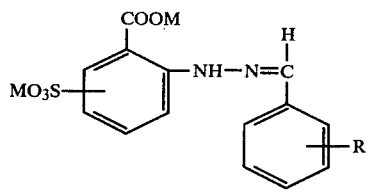 (2)

wherein R and M are as defined in claim 1, reacts with the diazonium compound of an aromatic amine of the formula (3)

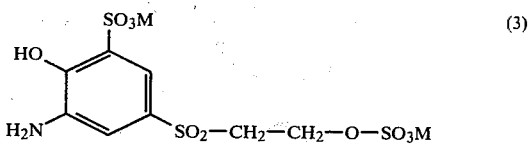 (3)

wherein M is as defined in claim 1, and with a copper-donating agent at a pH of from 4 to 7 and at a temperature in the range of from about 0° to 20° C. and the reaction solution obtained after the synthesis is adjusted to a pH below 2 and maintained at said pH for about 30 minutes to 2 hours at room temperature.

5. A compound according to claim 1, 2 or 3 wherein M is sodium or potassium.

* * * * *